United States Patent
Shi et al.

(10) Patent No.: US 12,325,394 B2
(45) Date of Patent: Jun. 10, 2025

(54) PARKING BRAKE CONTROL METHOD FOR ELECTROMECHANICAL BRAKE SYSTEM OF URBAN RAIL VEHICLE

(71) Applicant: CRRC Nanjing Puzhen Co., Ltd., Nanjing (CN)

(72) Inventors: Rui Shi, Nanjing (CN); Yifan Liang, Nanjing (CN); Meng Shi, Nanjing (CN); Xiaowei Chen, Nanjing (CN); Shenyue Huang, Nanjing (CN); Nan Wang, Nanjing (CN)

(73) Assignee: CRRC Nanjing Puzhen Co., Ltd., Nanjing (CN)

( * ) Notice: Subject to any disclaimer, the term of this patent is extended or adjusted under 35 U.S.C. 154(b) by 0 days.

(21) Appl. No.: 18/559,839

(22) PCT Filed: Sep. 6, 2022

(86) PCT No.: PCT/CN2022/117158
§ 371 (c)(1),
(2) Date: Nov. 9, 2023

(87) PCT Pub. No.: WO2023/051184
PCT Pub. Date: Apr. 6, 2023

(65) Prior Publication Data
US 2024/0246521 A1    Jul. 25, 2024

(30) Foreign Application Priority Data
Sep. 29, 2021 (CN) .......................... 202111153090.4

(51) Int. Cl.
*B60T 13/74* (2006.01)
*B60T 13/66* (2006.01)
*B60T 17/22* (2006.01)

(52) U.S. Cl.
CPC .......... *B60T 13/741* (2013.01); *B60T 13/665* (2013.01); *B60T 17/228* (2013.01); *B60T 2270/402* (2013.01)

(58) Field of Classification Search
CPC .... B60T 13/741; B60T 13/665; B60T 17/228; B60T 2270/402; B61H 13/20; B61H 13/02; B61H 13/34
See application file for complete search history.

(56) References Cited

U.S. PATENT DOCUMENTS 6,406,102 B1 * 6/2002 Arnold .................... B60T 13/74
                                                         303/20
2019/0115575 A1 * 4/2019 Chikamori ............ B60T 17/228

FOREIGN PATENT DOCUMENTS

| CN | 202541577 U | 11/2012 |
| CN | 108437963 A | 8/2018 |

(Continued)

*Primary Examiner* — Xiao En Mo
(74) *Attorney, Agent, or Firm* — Bayramoglu Law Offices LLC

(57) ABSTRACT

A parking brake control method for an electromechanical brake system of an urban rail vehicle includes an operation instruction mechanism, a brake control mechanism, an electromechanical actuating mechanism and an auxiliary mechanism. The operation instruction mechanism outputs a control signal to the brake control mechanism to drive the action of the electromechanical actuating mechanism so as to achieve braking application and relief of the vehicle. The auxiliary mechanism is used for a redundant power supply system of a brake system. The auxiliary mechanism further includes a zero-speed state monitoring mechanism for monitoring a zero-speed state of the vehicle and an energy storage battery mechanism for providing a backup power supply. The parking brake control method enables an urban rail vehicle using an electromechanical brake system to achieve brake application and relief in a parked state and achieve brake (Continued)

application and relief in a dormant state of the urban rail vehicle.

6 Claims, 2 Drawing Sheets

(56) References Cited

FOREIGN PATENT DOCUMENTS

| | | |
|---|---|---|
| CN | 110942691 A | 3/2020 |
| CN | 111169485 A | 5/2020 |
| CN | 113895476 A | 1/2022 |

* cited by examiner

PARKING BRAKE CONTROL METHOD FOR ELECTROMECHANICAL BRAKE SYSTEM OF URBAN RAIL VEHICLE

CROSS REFERENCE TO THE RELATED APPLICATIONS

This application is the national phase entry of International Application No. PCT/CN2022/117158, filed on Sep. 6, 2022, which is based upon and claims priority to Chinese Patent Application No. 202111153090.4, filed on Sep. 29, 2021, the entire contents of which are incorporated herein by reference.

TECHNICAL FIELD

The present invention relates to the field of urban rail vehicle braking and in particular to a parking brake control method for an electromechanical brake system of an urban rail vehicle.

BACKGROUND

At present, the most mature control scheme of urban rail vehicle is air brake mode, which is mainly composed of an air supply system, a basic brake system and a brake control system. The air supply system provides compressed air for the brake system, and is mainly composed of an air compressor, a dryer, an air cylinder, a main air pipe running through the whole vehicle and a cock, etc. The basic brake system receives pressure air to implement corresponding braking force, and is mainly composed of a brake cylinder, a brake shoe or a brake disc, etc. The brake control system core device is a brake control device. The brake control device integrates an electronic brake control unit, an electric-pneumatic conversion valve, a relay valve, an emergency brake valve, etc.

According to the train parking brake control based on the air braking scheme, the application and relief of parking braking force and the automatic application of parking braking force after the vehicle is dormant and the total wind leakage are controlled by controlling the force relationship between the wind pressure and the spring between the brake cylinder and the parking brake cylinder.

According to the air braking scheme, compressed air is used as the execution medium of the brake system. The structure of this brake system is relatively complex and there are many parts, which is not conducive to the integration of the brake system. At the same time, there are more components in the air supply system and more failure points, so that the failure rate is high. In addition, the air brake system has a long brake response time, and the braking force control accuracy is relatively low.

Therefore, it is a better setting to use the electromechanical brake system to replace the traditional air brake system. In the process of using the electromechanical brake system in a creative application manner to replace the air brake system in urban rail vehicles, there are differences in the triggering principle between the parking brake controlled by the traditional air circuit and the parking brake controlled by the circuit. Namely, the air brake system uses the pressure of the control air cylinder to control the application or relief of the parking brake. At the same time, the parking brake is automatically applied with the decrease of the main air pressure as the leakage of the main air. The electromechanical brake systems cannot employ the above-described control schemes. At the same time, since the electromechanical brake is completely triggered and relieved by the circuit control, the electromechanical brake is applied by the control of the power supply circuit over the electric tread. However, after the power supply is lost, the brake motor cannot execute the instruction of the control circuit. At the same time, after the vehicle is dormant, the power supply of the brake system is disconnected. The parking brake cannot be automatically applied over time as in the traditional air brake system, resulting in the risk of vehicle sliding after the vehicle is dormant. For the first loading design of electromechanical brake system, many control schemes on vehicle side are still blank, and there is no corresponding parking control scheme.

In response to the above-described deficiencies, there is an urgent need for a parking brake control method for an electromechanical brake system of an urban rail vehicle.

SUMMARY

The technical problem to be solved by the present invention is to address the above-mentioned deficiencies of the prior art, and to provide a parking brake control method for an electromechanical brake system of an urban rail vehicle, which enables an urban rail vehicle using an electromechanical brake system to achieve brake application and relief in a parked state and to achieve brake application and relief in a dormant state of the urban rail vehicle.

In order to solve the technical problems, the technical solution provided by the invention is as follows.

A parking brake control method for an electromechanical brake system of an urban rail vehicle includes an operation instruction mechanism, a brake control mechanism, an electromechanical actuating mechanism and an auxiliary mechanism; wherein the operation instruction mechanism outputs a control signal to the electromechanical actuating mechanism, drives the action of the brake control mechanism to achieve brake application and relief of the vehicle; and the auxiliary mechanism is used for a redundant power supply system of the brake system;

the control method specifically includes the following steps:

S1, signal judgment of the brake control mechanism: issuing an operation command by the operation instruction mechanism in the vehicle, outputting a power gain and power loss signal of parking application of a train line, a power gain and power loss signal of parking relief of a train line and a power gain and power loss signal of a zero-speed train line, wherein these three control signals are input to the brake control mechanism; outputting a control power source and a control signal to the electromechanical actuating mechanism by logical judgment of the brake control mechanism;

S2, brake application of the parked train: energizing the zero-speed train when the train stops; operating a parking brake application button on a driver platform, outputting a power gain signal of parking application of a train line and a power loss signal of parking relief of a train line by the operation instruction mechanism; after the brake control mechanism receiving three logic signals, providing a control power source and outputting a parking brake application instruction to the electromechanical actuating mechanism; controlling the forward rotation of a bogie brake motor by the electromechanical actuating mechanism to apply a control parking brake; after the brake application is completed, inputting a feedback signal into the brake control mechanism by the electromechanical actuating mechanism;

S3, brake relief of the parked train: energizing the zero-speed train when the train stops; operating a parking brake relief button on a driver platform, outputting a power loss signal of parking application of a train line and a power gain signal of parking relief of a train line by the operation instruction mechanism; after the brake control mechanism receiving three logic signals, providing a control power source and outputting a parking brake relief instruction to the electromechanical actuating mechanism; controlling the reverse rotation of a bogie brake motor by the electromechanical actuating mechanism to relieve a control parking brake; after the brake application is completed, inputting a feedback signal into the brake control mechanism by the electromechanical actuating mechanism;

S4, brake application when the parked train is dormant: not applying the parking brake when the parked vehicle does not operate the parking brake application button; after the vehicle is dormant and before the DC 110V power supply of the brake control mechanism is cut off, inputting a dormant state signal to the brake control mechanism and the auxiliary mechanism by the operation instruction mechanism in the parked vehicle; at this time, automatically applying the parking brake by the brake control mechanism to complete dormant brake of the parked train.

Further preferably, the auxiliary mechanism includes a zero-speed state monitoring mechanism for monitoring a zero-speed state of the vehicle; and the auxiliary mechanism also includes an energy storage battery mechanism for providing a backup power source.

As a further preferred aspect of the present invention, the dormant state signal includes outputting a power loss signal of parking application of a train line, a power loss signal of parking relief of a train line and a power gain signal of a zero-speed train line.

According to a further preferred aspect of the present invention, after the vehicle is dormant and before the DC 110V power supply of the brake control mechanism is cut off, the parked vehicle inputs a dormant state signal to the brake control mechanism and the auxiliary mechanism by the operation instruction mechanism; the zero-speed state monitoring mechanism of the auxiliary mechanism monitors the zero-speed state of the vehicle; the energy storage battery mechanism of the auxiliary mechanism outputs a backup power supply; and the brake control mechanism applies the parking brake and completes the dormant brake of the parked train.

As a further preferred aspect of the present invention, the auxiliary mechanism detects an auxiliary power failure; in order to prevent the vehicle from being unable to apply the parking brake, when the vehicle is in a zero-speed state, a control power source is provided and a parking brake relief instruction is output to the electromechanical actuating mechanism to apply the parking brake; and a auxiliary mechanism failure is displayed on a network control screen.

The invention have the following advantageous effects.

1. To make up for the deficiency of the control scheme of applying and relieving the parking brake of electromechanical brake system, the braking force of urban rail vehicle can be automatically applied and relieved in the parking state by operating the command mechanism, the electromechanical actuating mechanism and the brake control mechanism. The control method is simple and efficient, with a low failure rate.
2. Automatic application and relief of the braking force may be achieved when the urban rail vehicle is in a dormant state, eliminating the slipping situation where the urban rail vehicle is stopped in a garage or on a slope.
3. In case of auxiliary power failure, when the zero-speed state of urban rail vehicle is detected, parking brake can be automatically applied to ensure vehicle safety, and the fault feedback can be uploaded to TCMS.

Figure 1:
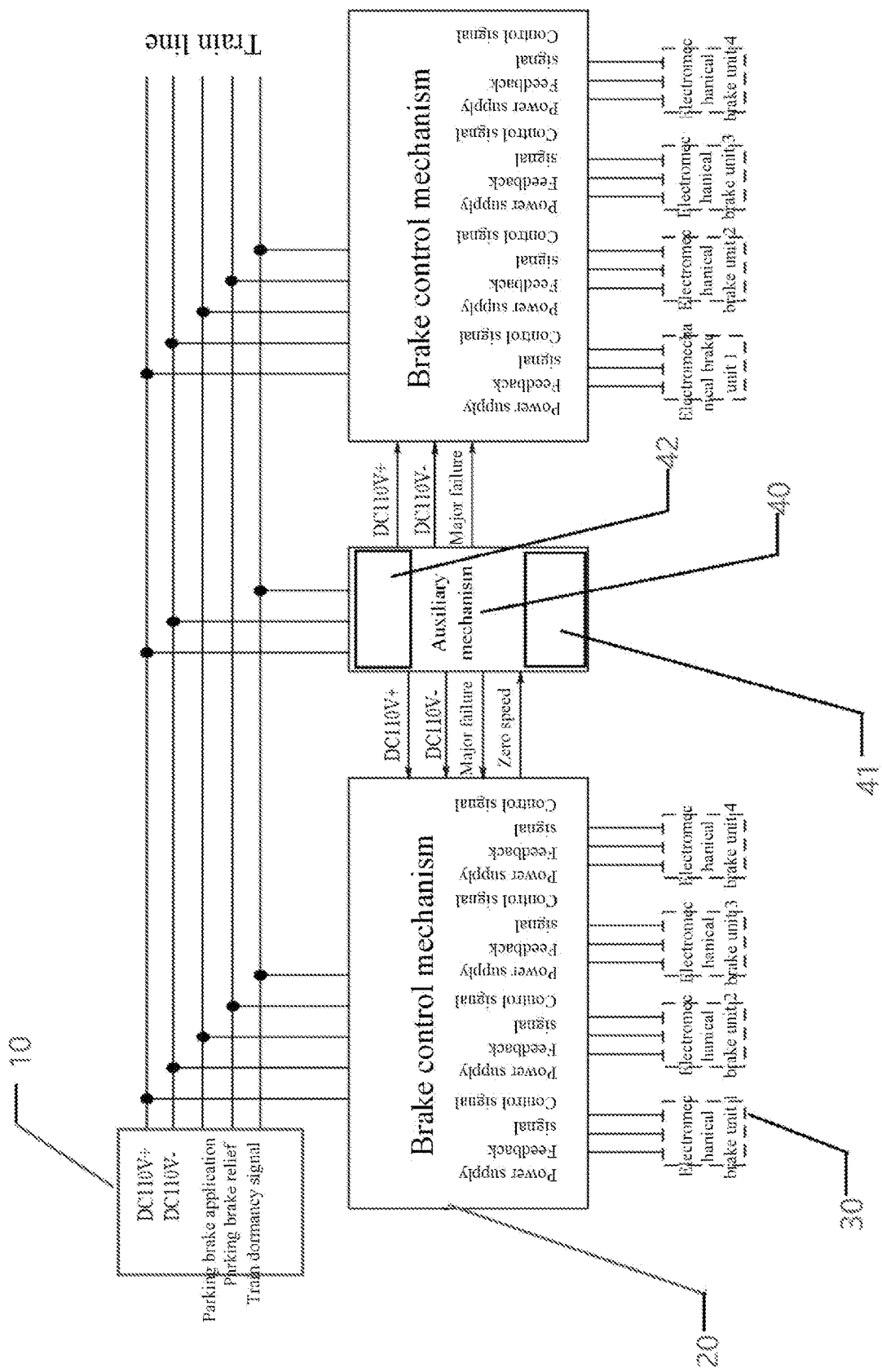
FIG. 1 is a schematic diagram of a parking brake control method for an electromechanical brake system of an urban rail vehicle according to the present invention.

In the drawings, 10, operation instruction mechanism; 20, brake control mechanism; 30, electromechanical actuating mechanism; 40, auxiliary mechanism; 41, zero-speed state monitoring mechanism; 42. energy storage battery mechanism.

DETAILED DESCRIPTION OF THE EMBODIMENTS

In the description of the present invention, it should be understood that the directional or positional relationships indicated by the terms "left", "right", "upper", "lower" and the like are based on the directional or positional relationships shown in the drawings. It is merely for the purpose of describing the present invention and simplifying the description, and is not intended to indicate or imply that a particular orientation, configuration and operation of the referenced device or element is required. "First", "second", etc., does not mean the importance of the parts, and should not be construed as limiting the present invention. The specific dimensions used in this example are for illustrative purposes only and do not limit the scope of the invention.

The present invention will now be further described in detail with reference to the accompanying drawings and detailed description.

Figure 2:
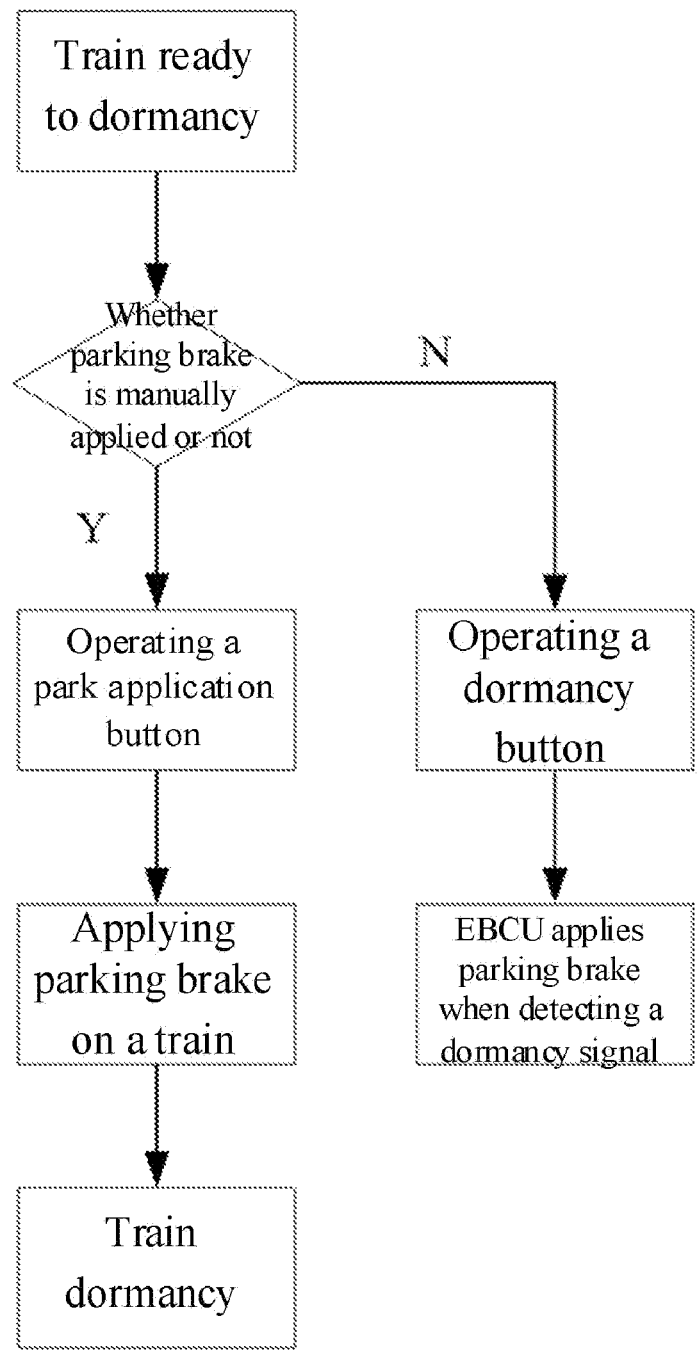
FIG. 2 is a schematic block diagram of a parking brake application during dormancy for a parking brake control method for an electromechanical brake system of an urban rail vehicle according to the present invention.

As shown in FIGS. 1 and 2, a parking brake control method for an electromechanical brake system of an urban rail vehicle includes an operation instruction mechanism 10, a brake control mechanism 20, an electromechanical actuating mechanism 30, and an auxiliary mechanism 40. The operation instruction mechanism 10 outputs a control signal to the electromechanical actuating mechanism 30 to drive the action of the brake control means 20 so as to achieve braking application and relief of the vehicle. The auxiliary mechanism is used for a redundant power supply system of a brake system.

The auxiliary mechanism 40 further includes a zero-speed state monitoring mechanism 41 for monitoring a zero-speed state of the vehicle and an energy storage battery mechanism 42 for providing a backup power source.

The control method specifically includes the following steps:

S1, signal judgment of the brake control mechanism 20: issuing an operation command by the operation instruction mechanism 10 in the vehicle, outputting a power gain and power loss signal of parking application of a train line, a power gain and power loss signal of parking relief of a train line and a power gain and power loss signal of a zero-speed train line, wherein these three control signals are input to the brake control mechanism 20; outputting a control power source and a control signal to the electromechanical actuating mechanism 30 by logical judgment of the brake control mechanism 20;

The logic judgment table of the brake control mechanism 20 is as follows.

| Serial Number | Parking application of a train line | Parking relief of a train line | Zero-speed train | Brake application state | Remarks |
|---|---|---|---|---|---|
| 1 | Power gain | Power loss | 1 | Applying | |
| 2 | Power gain | Power loss | 0 | Relieving | |
| 3 | Power gain | Power gain | 1 | Applying/Relieving | Maintaining a previous state while uploading a train line fault to TCMS |
| 4 | Power gain | Power gain | 0 | Relieving | |
| 5 | Power loss | Power gain | 1 | Relieving | |
| 6 | Power loss | Power gain | 0 | Relieving | |
| 7 | Power loss | Power loss | 1 | Applying | Detection of zero-speed signal application |
| 8 | Power loss | Power loss | 0 | Relieving | |

S2, brake application of the parked train: energizing the zero-speed train when the train stops; operating a parking brake application button on a driver platform, outputting a power gain signal of parking application of a train line and a power loss signal of parking relief of a train line by the operation instruction mechanism 10; after the brake control mechanism 20 receiving three logic signals, providing a control power source and outputting a parking brake application instruction to the electromechanical actuating mechanism 30; controlling the forward rotation of a bogie brake motor by the electromechanical actuating mechanism 30 to apply a control parking brake; after the brake application is completed, inputting a feedback signal into the brake control mechanism 20 by the electromechanical actuating mechanism 30;

S3, brake relief of the parked train: energizing the zero-speed train when the train stops; operating a parking brake relief button on a driver platform, outputting a power loss signal of parking application of a train line and a power gain signal of parking relief of a train line by the operation instruction mechanism 10; after the brake control mechanism 20 receiving three logic signals, providing a control power source and outputting a parking brake relief instruction to the electromechanical actuating mechanism 30; controlling the reverse rotation of a bogie brake motor by the electromechanical actuating mechanism 30 to relieve a control parking brake; after the brake application is completed, inputting a feedback signal into the brake control mechanism 20 by the electromechanical actuating mechanism 30; and S4, brake application when the parked train is dormant: not applying the parking brake when the parked vehicle does not operate the parking brake application button; after the vehicle is dormant and before the DC 110V power supply of the brake control mechanism 20 is cut off, inputting a dormant state signal to the brake control mechanism 20 and the auxiliary mechanism 40 by the operation instruction mechanism 10 in the parked vehicle; at this time, automatically applying the parking brake by the brake control mechanism 20 to complete dormant brake of the parked train.

The dormant state signal includes outputting a power loss signal of parking application of a train line, a power loss signal of parking relief of a train line and a power gain signal of a zero-speed train line. After the vehicle is dormant and before the DC 110V power supply of the brake control mechanism 20 is cut off, the parked vehicle inputs a dormant state signal to the brake control mechanism 20 and the auxiliary mechanism 40 by the operation instruction mechanism 10. The zero-speed state monitoring mechanism 41 of the auxiliary mechanism monitors the zero-speed state of the vehicle. The energy storage battery mechanism 42 of the auxiliary mechanism outputs a backup power supply. The brake control mechanism 20 applies the parking brake and completes the dormant brake of the parked train.

The auxiliary mechanism 40 detects an auxiliary power failure; in order to prevent the vehicle from being unable to apply the parking brake, when the vehicle is in a zero-speed state, a control power source is provided and a parking brake relief instruction is output to the electromechanical actuating mechanism 30 to apply the parking brake; and an auxiliary mechanism 40 failure is displayed on a network control screen.

The present invention makes up for the deficiency of a control scheme for parking brake application and relief of an electromechanical brake system. The automatic application and relief of a braking force of an urban rail vehicle in a parked state is achieved by operating a command mechanism, an electromechanical actuating mechanism and a brake control mechanism. At the same time, the automatic application and relief of the braking force may be achieved when the urban rail vehicle is in a dormant state, eliminating the slipping situation where the urban rail vehicle is stopped in a garage or on a slope. In the case of auxiliary power failure, when the zero-speed state of urban rail vehicle is detected, parking brake can be automatically applied to ensure vehicle safety, and the failure feedback is uploaded to TCMS for subsequent elimination of the failure.

While the preferred embodiments of the present invention have been described in detail, it should be understood that the invention is not limited to the details of the foregoing embodiments. Within the scope of the technical conception of the invention, a variety of equivalent transformations can be made for the technical solutions of the invention, which belong to the protection scope of the invention.

What is claimed is:

1. A parking brake control method for an electromechanical brake system of an urban rail vehicle, comprising: arranging an operation instruction mechanism, a brake control mechanism, an electromechanical actuating mechanism and an auxiliary mechanism; wherein the operation instruction mechanism-outputs a control signal to the brake control mechanism to drive an action of the electromechanical actuating mechanism so as to achieve braking application and relief of the urban rail vehicle; and the auxiliary mechanism is used for a redundant power supply system of a brake system;

the control method further comprises the following steps:

S1, signal judgment of the brake control mechanism: issuing an operation command by the operation instruction mechanism in the urban rail vehicle, outputting a power gain and power loss signal of parking application of a train line, a power gain and power loss signal of parking relief of the train line and a power gain and power loss signal of a zero-speed train line, wherein these three control signals are input to the brake control mechanism; outputting a control power source and a control signal to the electromechanical actuating mechanism by logical judgment of the brake control mechanism;

S2, brake application of the parked train: energizing the zero-speed train when the train stops; operating a parking brake application button on a driver platform, outputting a power gain signal of parking application of the train line and a power loss signal of parking relief of the train line by the operation instruction mechanism; after the brake control mechanism receives three logic signals, providing a control power source and outputting a parking brake application instruction to the electromechanical actuating mechanism; controlling a forward rotation of a bogie brake motor by the electromechanical actuating mechanism to apply a control parking brake; after the brake application is completed, inputting a feedback signal into the brake control mechanism by the electromechanical actuating mechanism;

S3, brake relief of the parked train: energizing the zero-speed train when the train stops;

operating a parking brake relief button on the driver platform, outputting a power loss signal of parking application of the train line and a power gain signal of parking relief of the train line by the operation instruction mechanism; after the brake control mechanism receives three logic signals, providing a control power source and outputting a parking brake relief instruction to the electromechanical actuating mechanism; controlling a reverse rotation of the bogie brake motor by the electromechanical actuating mechanism to relieve a control parking brake; after the brake application is completed, inputting the feedback signal into the brake control mechanism by the electromechanical actuating mechanism; and S4, brake application when the parked train is dormant: not applying the parking brake when the parked urban rail vehicle does not operate the parking brake application button; after the urban rail vehicle is dormant and before a DC 110V power supply of the brake control mechanism is cut off, inputting a dormant state signal to the brake control mechanism and the auxiliary mechanism by the operation instruction mechanism in the parked urban rail vehicle; at this time, automatically applying the parking brake by the brake control mechanism to complete dormant brake of the parked train.

2. The parking brake control method for the electromechanical brake system of the urban rail vehicle according to claim 1, wherein the auxiliary mechanism comprises a zero-speed state monitoring mechanism for monitoring a zero-speed state of the urban rail vehicle, and the auxiliary mechanism also comprises an energy storage battery mechanism for providing a backup power source.

3. The parking brake control method for the electromechanical brake system of the urban rail vehicle according to claim 1, wherein the dormant state signal comprises outputting the power loss signal of parking application of the train line, the power loss signal of parking relief of the train line and a power gain signal of the zero-speed train line.

4. The parking brake control method for the electromechanical brake system of the urban rail vehicle according to claim 2, wherein after the urban rail vehicle is dormant and before the DC 110V power supply of the brake control mechanism is cut off, the parked urban rail vehicle inputs the dormant state signal to the brake control mechanism and the auxiliary mechanism by the operation instruction mechanism; the zero-speed state monitoring mechanism of the auxiliary mechanism monitors the zero-speed state of the urban rail vehicle; the energy storage battery mechanism of the auxiliary mechanism outputs a backup power supply; and the brake control mechanism applies the parking brake and completes the dormant brake of the parked train.

5. The parking brake control method for the electromechanical brake system of the urban rail vehicle according to claim 2, wherein the auxiliary mechanism detects an auxiliary power failure; in order to prevent the urban rail vehicle from being unable to apply the parking brake, when the urban rail vehicle is in the zero-speed state, the control power source is provided and a parking brake relief instruction is output to the electromechanical actuating mechanism to apply the parking brake; and an auxiliary mechanism failure is displayed on a network control screen.

6. The parking brake control method for the electromechanical brake system of the urban rail vehicle according to claim 3, wherein after the urban rail vehicle is dormant and before the DC 110V power supply of the brake control mechanism is cut off, the parked urban rail vehicle inputs the dormant state signal to the brake control mechanism and the auxiliary mechanism by the operation instruction mechanism; a zero-speed state monitoring mechanism of the auxiliary mechanism monitors the zero-speed state of the urban rail vehicle; an energy storage battery mechanism of the auxiliary mechanism outputs a backup power supply; and the brake control mechanism applies the parking brake and completes the dormant brake of the parked train.

* * * * *